(12) United States Patent
Ball et al.

(10) Patent No.: US 7,757,219 B2
(45) Date of Patent: *Jul. 13, 2010

(54) METHOD FOR ENHANCING PROGRAM ANALYSIS

(75) Inventors: Thomas J. Ball, Mercer Island, WA (US); Sriram K. Rajamani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1312 days.

This patent is subject to a terminal disclaimer.

(21) Appl. No.: 10/978,989

(22) Filed: Nov. 1, 2004

(65) Prior Publication Data
US 2005/0149904 A1    Jul. 7, 2005

Related U.S. Application Data

(63) Continuation of application No. 09/866,090, filed on May 25, 2001, now Pat. No. 6,904,590.

(51) Int. Cl.
*G06F 9/44* (2006.01)
(52) U.S. Cl. .................. 717/132; 717/104; 717/128
(58) Field of Classification Search ......... 717/124–133, 717/136–144, 151–161, 104–105
See application file for complete search history.

(56) References Cited

U.S. PATENT DOCUMENTS 6,904,590 B2 *   6/2005   Ball et al. ................... 717/132

OTHER PUBLICATIONS

Larus et al., "Optimal Profiling and Tracing Programs", ACM, pp. 1-38, Jul. 1994.*
Ball et al., "On The Limit of Control Flow Analysis for Regression Test Selection", ACM, pp. 1-9, 1998.*
Ball, "On The Limit of Control Flow Analysis for Regression Test Selection", 1998, ACM, pp. 1-9.*

* cited by examiner

*Primary Examiner*—Ted T Vo
(74) *Attorney, Agent, or Firm*—Merchant & Gould, P.C.

(57) ABSTRACT

Methods are discussed that enhance program analysis. One aspect of the invention includes a method for checking a model of a program. The method includes a control-flow graph having vertices from the model, applying a transfer function to each vertex to form a set of path edges, and analyzing the set of path edges of a vertex. The set of path edges includes valuations that are implicitly represented so as to inhibit an undesired explosion in the valuations that would hinder the act of analyzing.

12 Claims, 13 Drawing Sheets

```
int numUnits;
int level;
void getUnit() {
[1]  bool canEnter := F;
[2]  if (numUnits = 0) {
[3]    if (level > 10) {
[4]      NewUnit();
[5]      numUnits := 1;
[6]      canEnter := T;
[7]  } else canEnter := T;
[8]  if (canEnter)
[9]    if (numUnits = 0)
[10]     assert(F);
       else
[11]   gotUnit();
}
P  202
```

```
void getUnit() {
[1]  ...;
[2]  if (?) {
[3]    if (?) {
[4]      ...;
[5]      ...;
[6]      ...;
[7]  } else ...;
[8]  if (?)
[9]    if (?)
[10]     ...;
       else
[11]   ...;
}
B₁  204
``` bool nU0;
```
void getUnit() {
[1]  ...;
[2]  if (nU0) {
[3]    if (?) {
[4]      ...;
[5]      nU0:=F;
[6]      ...;
[7]  } else ...;
[8]  if (?)
[9]    if (nU0)
[10]     ...;
       else
[11]   ...;
}
B₂  206
``` bool nU0;
```
void getUnit() {
[1]  bool cE:=F;
[2]  if (nU0) {
[3]    if (?) {
[4]      ...;
[5]      nU0:=F;
[6]      cE:=T;
[7]  } else cE:=T;
[8]  if (cE)
[9]    if (nU0)
[10]     ...;
       else
[11]   ...;
}
B₃  208
```

```
          decl g;

main()
       begin
          decl h;
[6]       h := !g;
[7]       A(g,h);
[8]       skip;
[9]       A(g,h);
[10]      skip;
[11]      if (g) then
[12]         R: skip;
          else
[14]         skip;
          fi
       end A(a1,a2)
       begin
[20]      if (a1) then
[21]         A(a2,a1);
[22]         skip;
          else
[24]         g := a2;
          fi
       end
```

304 ⟶

```
bebop v1.0: (c) Microsoft Corporation.
Done creating bdd variables
Done building transition relations Label R reachable by following path:

Line 12         State g=1 h=0
Line 11         State g=1 h=0
Line 10         State g=1 h=0
   Line 22      State g=1 a1=1 a2=0
      Line 24   State g=1 a1=0 a2=1
      Line 20   State g=1 a1=0 a2=1
   Line 21      State g=1 a1=1 a2=0
   Line 20      State g=1 a1=1 a2=0
Line 9          State g=1 h=0
Line 8          State g=1 h=0
   Line 22      State g=1 a1=1 a2=0
      Line 24   State g=1 a1=0 a2=1
      Line 20   State g=1 a1=0 a2=1
   Line 21      State g=1 a1=1 a2=0
   Line 20      State g=1 a1=1 a2=0
Line 7          State g=1 h=0
Line 6          State g=1
```

```
[1]  if (z) {
[2]     x:=1;
     else
[3]     x:=z;
[4]  z:=y|x;
```

```
                Boolean g;
        [1]     main() {
        [2]      if (z) {
        [3]       x:=1;
                 else
        [4]       x:=0;

[5]      z:=y+x;

[6]      foo (z);
        [7]      skip;
        [8]     }

[9]     foo (z) {
        [10]     g:=1;
        [11]    }
```

700 ⟶

| v | Transfer$_v$ |
|---|---|
| skip<br>print<br>goto<br>return | $\lambda(\Omega_1,\Omega_2).(\Omega_2 = \Omega_1)$ |
| $x_1,...,x_k :=$<br>$e_1,...,e_k$ | $\lambda(\Omega_1,\Omega_2).(\Omega_2 = \Omega_1[x_1/\Omega_1(e_1)]...[x_k/\Omega_1(e_k)])$ |
| if(d)<br>while(d)<br>assert(d) | Transfer$_{v,true} = \lambda(\Omega_1,\Omega_2).((\Omega_1(d) = 1) \wedge (\Omega_2 = \Omega_1))$<br>Transfer$_{v,false} = \lambda(\Omega_1,\Omega_2).((\Omega_1(d) = 0) \wedge (\Omega_2 = \Omega_1))$ |
| pr($e_1,...,e_k$) | $\lambda(\Omega_1,\Omega_2).(\Omega_2 = \Omega_1[x_1/\Omega_1(e_1)]...[x_k/\Omega_1(e_k)])$,<br>where $x_1,...,x_k$ are the formal parameters of pr |

Fig.7

```
                global
902 ──PathEdges, SummaryEdges, WorkList                              ╱── 900

904 ──procedure Propagate(v,p)
       begin
  906 ──if p ⊄ PathEdges(v) then
      908 ──PathEdges(v) := PathEdges(v) ∪ p
      910 ──Insert v into WorkList fi
       fi
912 ──end 914 ──procedure Reachable(G_B)
       begin
  916 ──for all v ∈ V_B do PathEdges(v) := {}
  917 ──for all v ∈ Call_B do SummaryEdges(v) := {}
  918 ──PathEdges(First_B(main)) :=
           {⟨Ω,Ω⟩ | Ω is any valuation to globals and local variables of main}

920 ──WorkList := {First_B(main)}
  922 ──while WorkList ≠ 0 do
    924 ──remove vertex v from WorkList
    926 ──switch (v)
      928 ──case v ∈ Call_B:
              Propagate(sSucc_B(v), SelfLoop(Join(PathEdges(v), Transfer_v)))  ── 930
              Propagate(ReturnPt_B(v), Join(PathEdges(v), SummaryEdges(v)))    ── 932
      934 ──case v ∈ Exit_B:
              for each w ∈ Succ_B(v) do   ── 936
                let
                    c ∈ Call_B such that w = ReturnPt_B(c) and   ── 938
                    s = Lift_c(PathEdges(v), ProcOf_B(v))        ── 940
                in
                    if s ⊄ SummaryEdges(c) then    ── 944
                        SummaryEdges(c) := SummaryEdges(c) ∪ s    ── 946
                        Propagate(w, Join(PathEdges(c), SummaryEdges(c)));  ── 948
                ni
      950 ──case v ∈ Cond_B:
              Propagate(Tsucc_B(v), Join(PathEdges(v), Transfer_{v,true}))    ── 952
              Propagate(Fsucc_B(v), Join(PathEdges(v), Transfer_{v,false}))   ── 954
      956 ──case v ∈ V_B - Call_B - Exit_B - Cond_B:
              let p = Join(PathEdges(v), Transfer_v) in   ── 958
                  for each w ∈ Succ_B(v) do   ── 960
                      Propagate(w,p)  ── 962
                  ni
       end
```

Fig.9 global
$PE' : V_G \to$ set-of $(D \times D)$
$Worklist\ V_G \to$ set-of $(D \times D)$ procedure Propagate$(v : V_G, p : (D \times D))$
begin
  if $p \notin PE'(v)$ then
    $PE'(v) := PE'(v) \cup \{p\}$
    $Worklist(v) := Worklist(v) \cup \{p\}$
  fi
end procedure $CMOP_{SP_{rhs}}(S :$ set-of $D)$
begin
  $PE'(entry) := \{\langle d, d \rangle \mid d \in S\}$
  $Worklist(entry) := PE'(entry)$
  while $\exists v_2$ s.t $Worklist(v_2) \neq 0$ do
    select and remove $\langle d_1, d_2 \rangle$ from $Worklist(v_2)$
    for each $v_2 \to v_3 \in E_G$ do
      for each $d_3 \in M(v_2 \to v_3)(\{d_2\})$ do
        Propagate$(v_3 \langle d_1, d_3 \rangle)$
      od
    od
  od
end

Fig.12 global
$PE' : V \rightarrow$ set-of (set-of D x set-of D)
$Worklist : V_G \rightarrow$ set-of (set-of D x set-of D)

procedure Propagate($v$; $V_{G,p}$ : (set-of D x set-of D))
begin
  if $p \notin PE'(v)$ then
    $PE'(v) := PE'(v) \cup \{p\}$
    $Worklist(v) := Worklist(v) \cup \{p\}$
  fi
end procedure $CSMOP_{SP_{rhs}}$ ($S'$ : set-of (set-of D))
begin
  $PE'(entry) := \{\langle S,S \rangle \mid S \in S'\}$
    $Worklist(entry) := PE'(entry)$
    while $\exists v_2$ s.t $Worklist(v_2) \neq 0$ do
      select and remove $\langle S_1, S_2 \rangle$ from $Worklist(v_2)$
      for each $v_2 \rightarrow v_3 \in E_G$ do
        let $S_3 = M(v_2 \rightarrow v_3)(S_2)$ in
          Propagate($v_3, \langle S_1, S_3 \rangle$)
        ni
      od
    od
end

Fig.13

METHOD FOR ENHANCING PROGRAM ANALYSIS

REFERENCE TO RELATED APPLICATIONS

The present application is related to co-pending patent application "Method and System for Detecting Pirated Content", filed Apr. 24, 2001 and having Ser. No. 09/843,102 which is hereby incorporated by reference.

REFERENCE TO RELATED APPLICATION

This application is a continuation of application Ser. No. 09/866,090, filed on May 25, 2001, which application is incorporated herein by reference.

TECHNICAL FIELD

The technical field relates generally to program analysis. More particularly, it pertains to a process of checking models of programs to enhance program analysis.

COPYRIGHT NOTICE—PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawing attached hereto: Copyright© 1999, 2000, Microsoft Corporation, All Rights Reserved.

BACKGROUND OF THE INVENTION

An important business goal for any software company is to build a software product within a desired time frame and within a desired budget. To compete effectively in the marketplace, the software product also has to have quality. A software product that has quality has a number of desirable software properties, such as making appropriate use of computer resources.

The process of checking for these software properties is made up of problems for which there is not a solution comprising a step-by-step procedure that can be implemented in a computer. Software scientists couch these problems as undecidable problems. However, for certain software properties that are determinable, it is possible in some cases to confirm or deny the existence of these software properties. But such a process of analyzing is nontrivial.

One reason that such a process of analyzing is nontrivial is because a software product is produced from a program that may have several statements. These statements may include several variables. Additionally, these statements often are organized into several procedures. The need to consider the prohibitively large combinations of statements, variables, and procedures would cripple the process of analysis.

Current analysis techniques provide inferior information to check for software properties. These techniques typically suffer from an explosion in the amount of information to be analyzed. As the size of programs has increased with each generation of technology, such inferior information may slow the improvement of programs and lead to the eventual lack of acceptance of such programs in the marketplace, thus, what is needed are systems and methods to enhance program analysis.

Tools called Model checkers have been built to check properties of hardware and protocol designs, but they do not directly work on software programs. In particular, existing model checkers do not exploit procedural abstraction that is characteristic of imperative programs. An algorithm proposed by Reps/Horwitz/Sagiv (RHS) has been used to perform interprocedural flow-sensitive analysis by use of an exploded graph representation of a program. The algorithm is applicable to interprocedural, finite, distributive, subset problems having a finite set D of dataflow facts and distributive dataflow functions. The RHS algorithm does not handle arbitrary dataflow functions. Further, if the number of dataflow facts is very large, the explicit supergraph structure built by the RHS algorithm can be prohibitively expensive to build. It is desirable to change the RHS algorithm to both handle arbitrary dataflow functions and represent parts of the supergraph implicitly, as done in symbolic model checking algorithms.

SUMMARY OF THE INVENTION

Systems and methods to enhance program analysis are described. An illustrative aspect includes a system for analyzing a program having multiple statements. The system includes a modeler to model the program, a graph generator to generate a control-flow graph from the model, and an analyzer to analyze each vertex of the control-flow graph to determine the reachability of each statement in the program. The analyzer forms an implicit representation of values of variables at each vertex so as to inhibit computational explosion.

Another illustrative aspect includes a method for analyzing a program. The method includes modeling the program to form a model having multiple statements, labeling a statement of the multiple statements with a label, determining whether the label is reachable, and providing a shortest trace to the label from the first line of the program if the label is determined to be reachable.

Another illustrative aspect includes a method for checking a model of a program. The method includes forming a control-flow graph having vertices to form the model. A transfer function is applied to each vertex to form a set of path edges which include valuations that are implicitly represented so as to inhibit an undesired explosion in the valuations. The set of path edges of a vertex are then analyzed.

Another illustrative aspect includes a method for checking a model of a program. The method includes receiving a graph having a set of vertices and a successor function; initializing sets of path edges, sets of summary edges which record the behavior of a procedure to avoid revisiting portions that have already been explored, and a work list; removing a vertex having a type from the work list; and analyzing the vertex based on the type so as to determine the reachability status of the vertex in the set of vertices. The act of analyzing includes updating a set of path edges associated with the vertex by using a transfer function associated with the vertex.

Another illustrative aspect includes a method for generating a trace for a model of a program. The method includes forming a control-flow graph having vertices from the model, applying a transfer function to each vertex to form a set of path edges, analyzing the set of path edges of a vertex, and tagging a unit length that the trace takes to reach the vertex from another vertex.

Another illustrative aspect includes an alternative method for generating a trace for a model of a program. The method includes forming a set of rings associated with each vertex of the model, finding a ring such that a set of path edges of a reachable vertex exists, and analyzing the reachable vertex based on a type of the reachable vertex so as to generate a trace from the entry of the main procedure of the program to the reachable vertex.

BRIEF DESCRIPTION OF THE DRAWINGS

FIG. 2 is a pictorial diagram showing a program and models of the program according to one aspect of the present invention.

FIG. 3 is a pictorial diagram showing a model and a trace to a label in the model according to one aspect of the present invention.

FIG. 7 is a tabular diagram showing a table containing transfer functions according to one aspect of the invention.

FIG. 9 is a programmatic diagram showing a technique for checking a model according to one aspect of the invention.

FIG. 12 is a programmatic diagram showing an algorithm for performing flow-sensitive dataflow analysis for programs.

FIG. 13 is a programmatic diagram showing a generalized algorithm for performing flow-sensitive dataflow analysis for programs.

DETAILED DESCRIPTION OF THE PREFERRED EMBODIMENT

Figure 1:
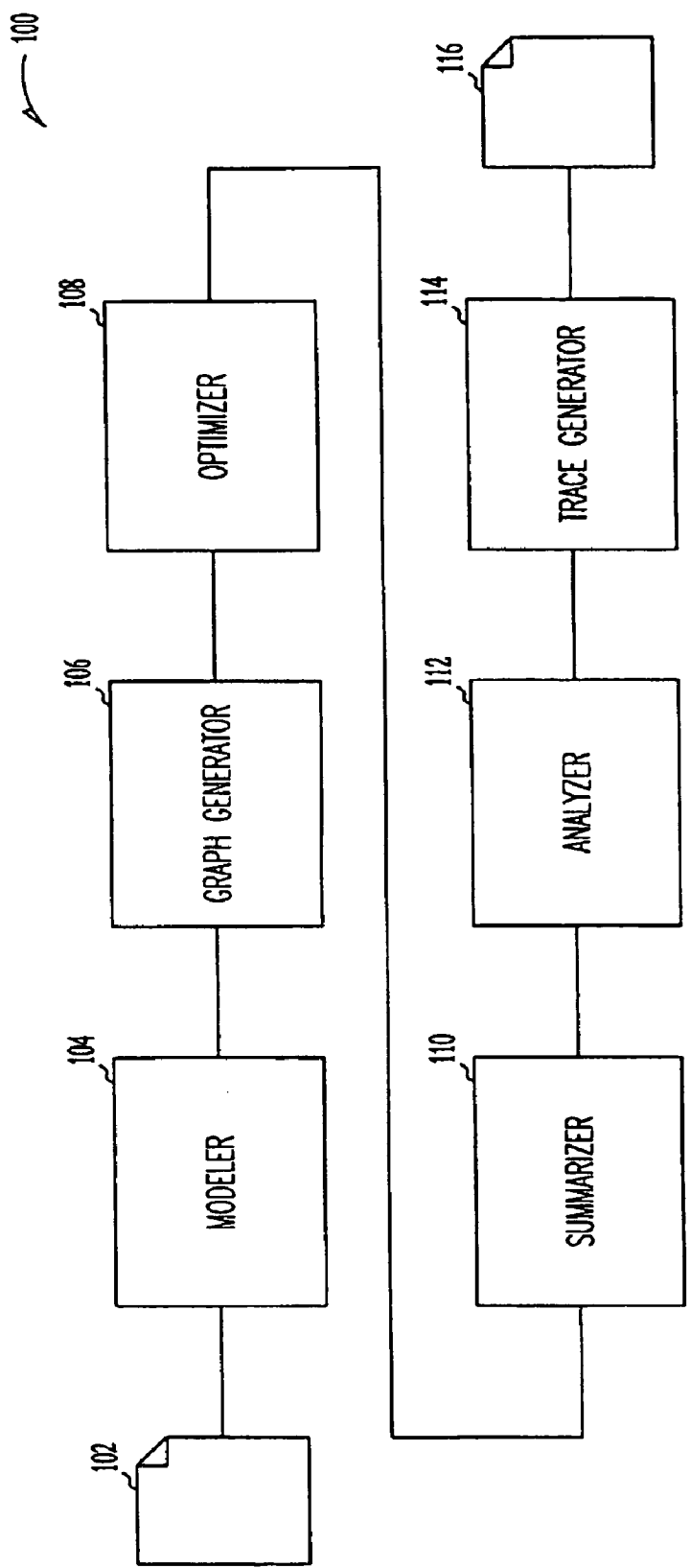
FIG. 1 is a block diagram of a system for analyzing a program according to one aspect of the present invention.

In the following detailed description of exemplary embodiments of the invention, reference is made to the accompanying drawings which form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

FIG. 1 is a block diagram of a system for analyzing a program according to one aspect of the present invention. A system 100 includes a program 102. The program 102 includes a list of statements that can be compiled to produce an executable file. This executable file may be turned into a software product to be sold in the marketplace.

The system 100 presents the program 102 to a modeler 104. The modeler 104 produces a model or Boolean program from the program 102. The model is a representation of the program 102 that includes a minimal set of information. This minimal set of information can be analyzed to confirm or deny that a property holds for some piece of code.

The model may be produced by any suitable technique, such as that described in a co-pending patent application "Method and System for Detecting Pirated Content", filed Apr. 24, 2001 and having Ser. No. 09/843,102 which is hereby incorporated by reference.

The system 100 presents the model to a graph generator 106. The graph generator 106 generates a control-flow graph. The control-flow graph eases the analysis of the program because of certain types of control flow, such as goto statements in the program. These types of control flow are instances of arbitrary intra-procedural control flow that complicate the analysis of the program.

The control-flow graph may be produced by any suitable techniques. One technique that produces a control-flow graph for Boolean programs is discussed by the above co-pending U.S. patent application.

The system 100 presents the control-flow graph to an optimizer 108. The optimizer 108 further minimizes the set of information in the control-flow graph to produce an enhanced control-flow graph. In one embodiment, the optimizer 108 uses a technique of live ranges to eliminate dead variables from the set of information. In another embodiment, the optimizer 108 uses a MOD/REF technique to eliminate global variables that are not changed by any procedure. As a result, the analysis of the program is further enhanced because information that is not used or changed is not considered in the analysis.

The system 100 includes a summarizer 110. The summarizer 110 summarizes each procedure in the model. Once a procedure is summarized, the analysis can ascertain the result of the procedure without having to analyze the procedure each time the procedure is called.

The system 100 includes an analyzer 112. The analyzer 112 analyzes each vertex of the control-flow graph to determine the reachability of each statement in the program. The reachability status of a statement may provide information to infer the existence of certain software properties. Such an inference may allow the inference of whether the software product has quality. The analyzer 112 forms an implicit representation of values of variables at each vertex so as to inhibit computational explosion. In one embodiment, the analyzer 112 uses a set of binary decision diagrams (BDDs) to implicitly represent the values of variables. The summarizer 110 and the analyzer 112 work together in a loop. The analyzer first produces some path edges, then the summarizer produces summary edges, then the analyzer may produce more path edges, etc.

The system 100 includes a trace generator 114. The trace generator 114 generates a trace to a vertex that is reachable. The trace generator 114 can generate a trace that is the shortest trace to the vertex. The trace generator 114 produces a display 116. The display 116 displays a path from a first statement in the main procedure of the program to a labeled statement in the program if the labeled statement is reachable.

FIG. 2 is a pictorial diagram showing a program and models of the program according to one aspect of the present invention. A diagram 200 includes a program 202. In one embodiment, the program 202 may be written in a non-imperative language. In another embodiment, the program 202 may also be written in an imperative language. In another embodiment, the program 202 may be written in a language, such as C, C++, or Java.

The diagram 200 includes various models of the program 202, such as models 204, 206, and 208. Models 204, 206, and 208 are Boolean programs. Models 206 and 208 are refinements of the model 204. A modeler may produce these models as discussed hereinbefore.

The various models include the symbol " . . . " which is indicative of the skip command. The skip command is an instruction that performs no action. The various models also include the symbol "?" which is indicative of the decider operator. The decider operator is an instruction that non-deterministically evaluates to true or false regardless of the logic of the expression in the model so as to allow an execution path to enter either branch of a control statement.

FIG. 3 is a pictorial diagram showing a model and a trace to a label in the model according to one aspect of the present invention. A model 302 illustrates a Boolean program. The model 302 includes a procedure called main and a procedure called A. The model includes a label R on line 12.

A user can pose the following question to the embodiments of the present invention: Is label R reachable? The answer to this question would be yes. The embodiments of the invention produce the output 304 to clarify this answer. The output 304 shows not only that label R is reachable but also shows the progression of a trace from the line labeled R to the first line of the procedure called main.

The embodiments of the invention produce this trace. In one embodiment, this trace is the shortest trace from the first line in the procedure called main to the label R. The embodiments of the invention also show for each line of the trace the state of the variables that are in scope.

Thus, in the example of FIG. 3, in order to reach the label R, the value of the variable g must initially be 1. Additionally, the trace shows that the value of the variable g does not change whenever the procedure called main calls the procedure A twice. The above information produced by the embodiments of the invention enhances the analysis of the program.

Figure 4:
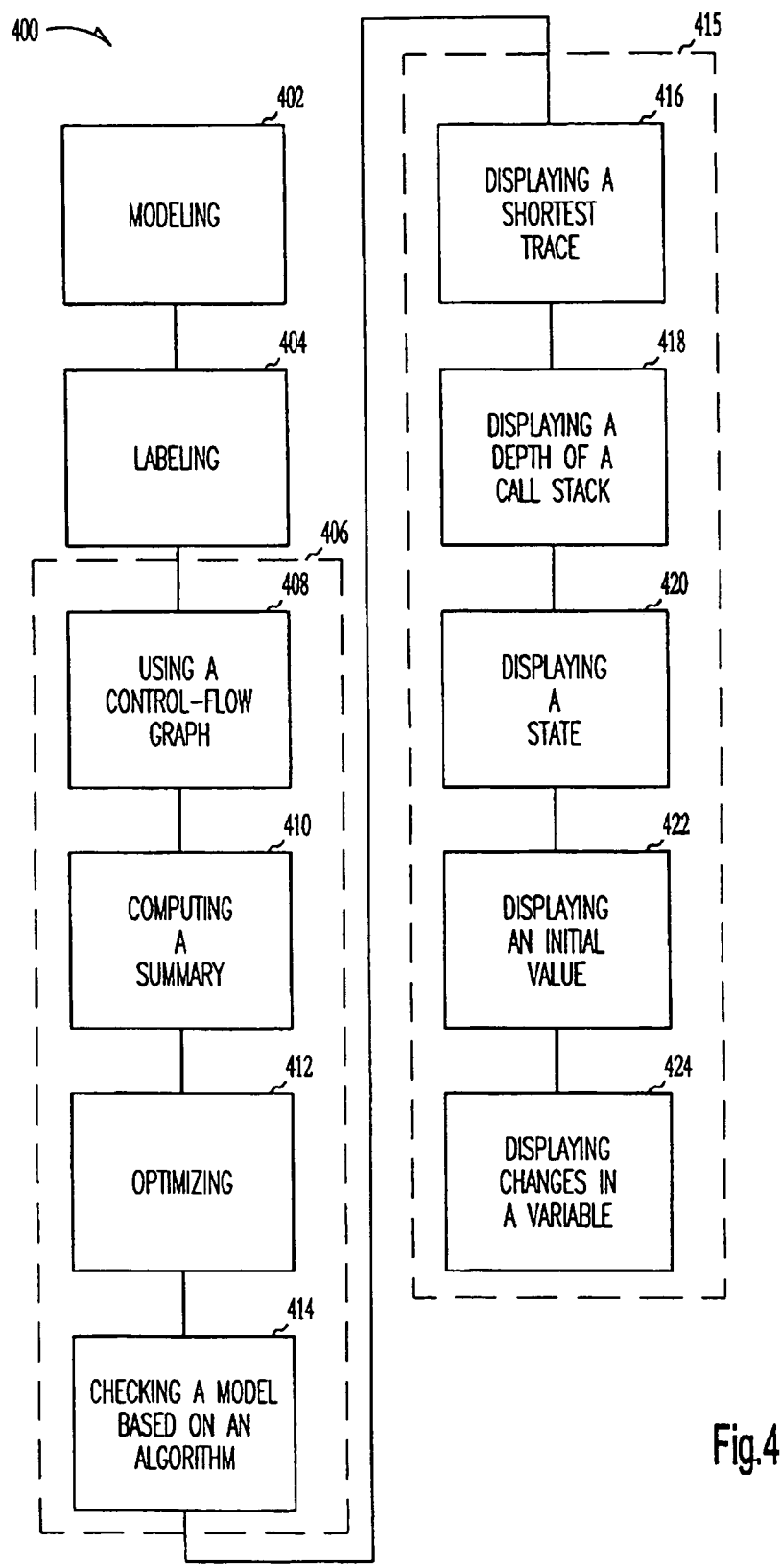
FIG. 4 is a process diagram of a method for analyzing a program according to one aspect of the present invention.

FIG. 4 is a process diagram of a method for analyzing a program according to one aspect of the present invention. A process 400 includes an act 402 for modeling the program to form a model having multiple statements. The model includes a Boolean program. The process 400 includes an act 404 for labeling a statement in the multiple statements with a label. The act of labeling allows a statement of interest to be referred to in the process of analysis.

The process 400 includes an act 406 for determining whether the label is reachable. The act 406 includes an act 408 for using an explicit control-flow graph. The explicit control-flow graph is easier to analyze than the syntactical expressions of a program. A summary is also computed. The summary records a behavior of a procedure for a given set of input values. The act 410 allows the act 406 to reuse the summary of the procedure without having to analyze the procedure again. The act 406 includes an act 412 for optimizing. The act 412 optimizes the set of information for analysis by eliminating information that is not used or changed. The act 406 also includes an act 414 for checking the model based on an algorithm which also computes summaries 410. The complexity of the algorithm in time and space is proportional to the number of edges of the control-flow graph multiplied by 2 to the power of k. The term "k" defines the maximum number of variables in scope at any point in the program.

The process 400 includes an act 415 for providing a shortest trace to the label from the first line of the program if the label is determined to be reachable. The act 415 includes an act 416 for displaying the shortest trace. The act 415 includes an act 418 for displaying a depth of a call stack when the shortest trace is displayed. The act 415 includes an act 420 for displaying the state of each variable in the program that is in scope when the shortest trace is displayed. The act 415 includes an act 422 for displaying the initial value of a variable of the program in order for the label to be reachable. The act 415 includes an act 424 for displaying changes in a variable due to a call to a procedure in the program.

Figures 5A, 5B:
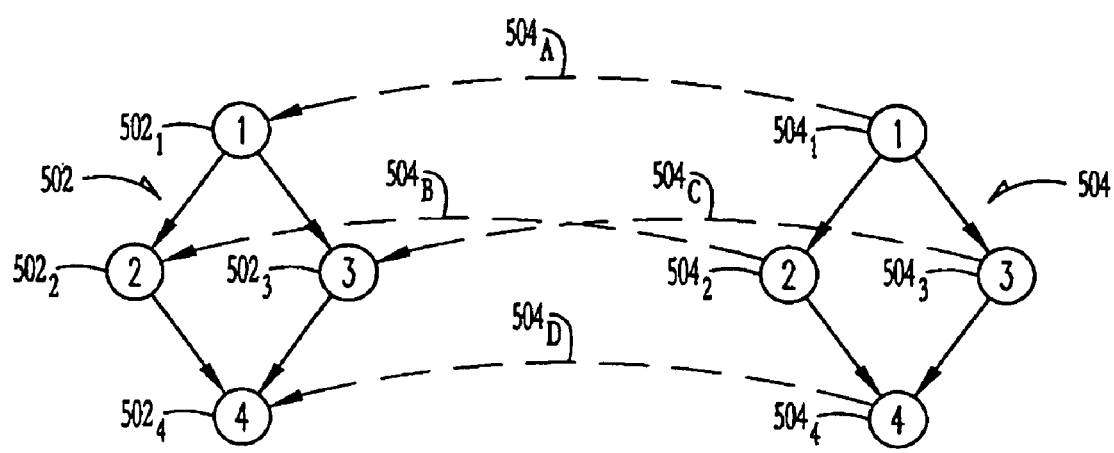
FIGS. 5A-5B illustrate an exemplary program, an exemplary control-flow graph, and an exemplary state diagram.

FIGS. 5A-5B illustrate an exemplary program, an exemplary control-flow graph, and an exemplary state diagram. FIG. 5A illustrates an exemplary program, such as a Boolean program 500. The embodiments of the invention assign a unique index in the range of 1 . . . n to each statement in the Boolean program 500, such as index 1, 2, 3, and 4. If the Boolean program 500 includes procedures, each procedure would also be assigned a unique index in the range of n+p+1. Let $s_i$ denote a statement in the program with an index i.

FIG. 5B illustrates a control-flow graph 502, which is derived from the Boolean program 500. The control-flow graph 502 is a directed graph $G_B=(V_B, Succ_B)$. The term $V_B$ is a set of vertices $\{1, 2, \ldots, n+p+1\}$. The set $V_B$ contains one vertex for each statement in a Boolean program, which is in the range of $\{1 \ldots n\}$, and one vertex that represents an exit vertex for every procedure in a Boolean program, which is in the range of $\{n+1 \ldots n+p\}$. The exit vertex for a procedure pr is expressed as $Exit_{pr}$. The set $V_B$ also contains an errant vertex, which is symbolized by the integer Err=n+p+1. The vertex Err models the failure of an assert statement in a Boolean program. For any procedure pr in a Boolean program, let $First_B(pr)$ be the index of the first statement in the procedure pr. For any vertex $v \in V_B - \{Err\}$, let $ProcOf_B(v)$ be the index of a procedure containing v.

Returning to FIG. 5B, the control-flow graph 502 includes a vertex $502_1$ which represents the statement 1 of a Boolean Program 500, a vertex $502_2$ which represents the statement 2 of a Boolean Program 500, a vertex $502_3$ which represents the statement 3 of a Boolean Program 500, and a vertex $502_4$ which represents the statement 4 of a Boolean Program 500.

The term $Succ_B$ of the directed graph $G_B$ is a function called a successor function. The successor function $Succ_B$ maps a vertex to its successor vertices. For example, the vertex $502_1$ has two successor vertices $502_2$ and $502_3$. This is because there are two logical outcomes for the if statement of the Boolean program 500: false or true. To simplify the presentation of the control-flow graph 502, every statement that is a call to a procedure is followed by a skip statement. If a statement $s_j$ is a procedure call, the term $ReturnPt_B(j)$ will result in a successor vertex, which represents a skip statement following the statement $s_j$.

FIG. 5B also illustrates a state diagram 504, which is derived from the Boolean program 500. The state diagram 504 includes a number of states, such as states $504_1$, $504_2$, $504_3$, and $504_4$. Each state may be symbolized by η. Each state η is a pair <i, Ω>. The term i is an element of the set of vertices $V_B$. The term Ω is a valuation. The term Ω associates every boolean variable, which is in scope with respect to the vertex i, with a Boolean value. Thus, a state contains the program counter, which is represented by i, and values to all the variables visible at that point, which is represented by Ω. The embodiments of the invention also define a projector operator Γ to map a state to its vertex. For example, Γ(<i, Ω>)=i.

A state can make a transition to another state. Such a transition is governed by a suitable context-free grammar that allows a reachability analysis to be performed. One suitable context-free grammar is discussed by *Ball and Rajamani*. The expression $\eta_1 \rightarrow^\alpha \eta_2$ indicates that a state $\eta_1$ can make an a transition to a state $\eta_2$.

A finite sequence $\eta' = \eta_0 \to^{\alpha_1} \eta_1 \to^{\alpha_2} \ldots \eta_{m-1} \to^{\alpha_m} \eta_m$ is called a trajectory of a Boolean program if the following conditions are satisfied: (1) for all $0 \leq i < m$, $\eta_i \to^{\alpha_i} \eta_{i+1}$ and (2) $\alpha_1 \ldots \alpha_m \in L(G(B))$. The second condition requires that any $\alpha$ transition be an element of a set of allowed transitions in accordance with a grammar G of a Boolean program B.

A trajectory $\eta'$ is called an initialized trajectory if $\eta_0$ is an initial state of a Boolean program. An initial state of a Boolean program is a state that includes an index to the first statement in a main procedure of a Boolean program. If $\eta'$ is an initialized trajectory, then the projection of $\eta'$ to its vertices, which is expressed by $\Gamma(\eta_0), \Gamma(\eta_1), \ldots, \Gamma(\eta_n)$, is called a trace of the Boolean program.

A state $\eta$ is reachable if there is an initialized trajectory of a Boolean program that ends in $\eta$. A vertex v, which is an element of the set of vertices $V_B$, is reachable if there exists a trace of the Boolean program that ends in the vertex v. FIG. 5B illustrates various projections of a state to its vertex, such as projection $504_A$, $504_B$, $504_C$, and $504_D$.

Figures 6A, 6B:
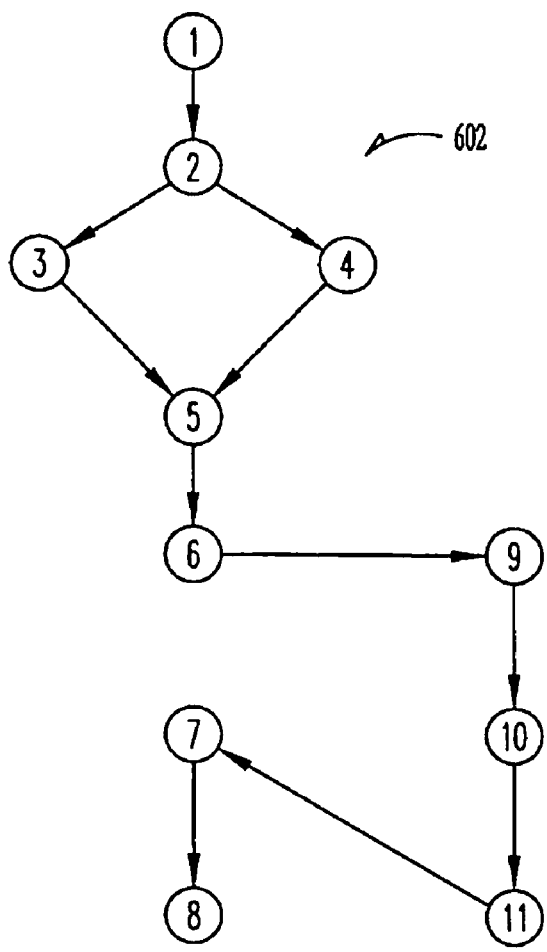
FIGS. 6A-6B illustrate an exemplary program and an exemplary control-flow graph.

FIGS. 6A-6B illustrate an exemplary program and an exemplary control-flow graph. FIG. 6A illustrates a program 600. The program 600 is a model of another program under analysis. The program 600 is a Boolean program provided by a modeler which is not shown but commonly available. The program 600 includes a procedure called main and a procedure called foo. The program 600 also includes a global variable g. Each statement and procedure of the program 600 is indexed by indices 1, 2, 3, 4, 5, 6, 7, 8, 9, 10, and 11. Note that the procedure main calls the procedure foo at index 6.

FIG. 6B illustrates a control-flow graph 602. The control-flow graph 602 is derived from the program 600 by the embodiments of the invention. The control-flow graph 602 includes a set of vertices, such as vertices 1, 2, 3, 4, 5, 6, 7, 8, 9, 10, and 11. These vertices mirror the indices of the program 600 because each vertex represents a statement or a procedure call in the program 600.

The embodiments of the invention can determine the reachability status of every vertex in the set of vertices. To do so, the embodiments of the invention compute sets of path edges that represent the reachability status of a vertex in a control-flow graph. The embodiments of the invention also compute sets of summary edges that record the input/output behavior of a procedure. The computation of path edges and summary edges involve a function called a transfer function.

In all embodiments, sets of path edges, sets of summary edges, and transfer functions are represented using an implicit representation. Such an implicit representation allows the desired compression of information that inhibits undesired computational explosion. In one embodiment, implicit representations may suitably be represented by Binary Decision Diagrams (BDD). Sets of path edges, sets of summary edges, and transfer functions are discussed hereinbelow.

A path edge is an edge that begins at a beginning vertex and ends at an ending vertex. The beginning vertex represents the first statement in a procedure P and the ending vertex represents a statement in procedure P. That is, a path edge is always between two vertices of the same procedure P, the first always being the vertex representing the first statement of P. Each vertex has a relationship with a state. Recall that each state includes the index and a valuation at the index. It is useful to represent a path edge in terms of valuations. Thus, a path edge of v is a pair of valuations $\langle \Omega_e, \Omega_v \rangle$. The term "v" is a vertex in a set of vertices $V_B$. The term "e" is the vertex of the first statement of a procedure containing the vertex v.

Two conditions are imposed on a path edge $\langle \Omega_e, \Omega_v \rangle$. The first condition is the existence of a trajectory $\eta_1' = \langle \text{First}_B(\text{main}), \Omega \rangle \ldots \langle e, \Omega_e \rangle$. The term "$\text{First}_B(\text{main})$" indicates that the index to the first state of the trajectory $\eta_1'$ is the index of the first statement of the procedure main in the program. Thus, the trajectory $\eta_1'$ is a trajectory from the first statement of the procedure main to the first statement of a procedure containing the vertex v. The second condition is the existence of another trajectory $\eta_2' = \langle e, \Omega e \rangle \ldots \langle v, \Omega_v \rangle$ that does not contain the exit vertex of the procedure that contains the vertex v. Thus, the trajectory $\eta_2'$ is a trajectory from the first statement of the procedure containing the vertex v to a statement in the procedure that derives the vertex v. Taking the two trajectories $\eta_1'$ and $\eta_2'$ together, the path edge of v represents a trajectory that starts from the first statement of the procedure main in the program to a statement that derives the vertex v. The path edge that results from trajectories $\eta_1'$ and $\eta_2'$ starts at the entry point of the procedure containing v and ends in vertex v.

Returning to FIG. 6B, consider the following example. If the statement with index 10 in the program 600 is reachable, then a path edge exists that starts from the first statement of the procedure main (statement with index 2) to the statement with index 10 in the procedure foo. In other words, the path edge of v, where v is 10, is a pair of valuations $\langle \Omega_9, \Omega_{10} \rangle$. $\eta_1'$ is $\langle 2, \Omega_2 \rangle \ldots \langle 9, \Omega_9 \rangle$. And $\eta_2'$ is $\langle 9, \Omega_9 \rangle \ldots \langle 10, \Omega_{10} \rangle$. The embodiments of the invention define the term "PathEdges(v)" to mean a set of all path edges that terminate at v.

A summary edge is a special kind of path edge that records the behavior of a procedure. Summary edges are used to avoid revisiting portions of the state space that have already explored. Summary edges enhance the analysis of programs with procedures and recursion.

Let c be a vertex in the set of vertices $V_B$ representing a procedure call. An example of the vertex c is the vertex 6 of FIG. 6B. A summary edge associated with c is a pair of valuations $\langle \Omega_1, \Omega_2 \rangle$. The valuation $\Omega_1$ represents the values of variables just prior to the call statement. The valuation $\Omega_2$ represents the values of variables just after the call statement. There are two conditions imposed on a summary edge. First, the local variables in the context of the vertex c are the same in valuation $\Omega_1$ as in valuation $\Omega_2$. Second, the global variables in the context of the vertex c change according to some path edge from the entry of the called procedure to the exit of the called procedure.

A summary edge can be obtained by a lifting technique defined by the following function: $\text{Lift}_c(P, pr) = \{\langle \Omega_1, \Omega_2 \rangle | \exists \langle \Omega_i, \Omega_o \rangle \in P$, and $\forall x \in \text{Locals}_B(c): \Omega_1(x) = \Omega_2(x)$, and $\forall x \in \text{Globals}_B(B): (\Omega_1(x) = \Omega_i(x) \wedge (\Omega_2(x) = \Omega_o(x))$, and $\forall$ formals $y_j$ of pr and actuals $e_j: \Omega_1(e_j) = \Omega_i(y_j)\}$.

The term "P" is the set of path edges at the exit vertex for a procedure pr, expressed as $\text{Exit}_{pr}$. The term "pr" denotes a procedure pr. The term "$\text{Lift}_c(P, pr)$" denotes lifting the set of path edges P to the call vertex c while respecting the semantics of the call and return transitions.

The term "$\langle \Omega_1, \Omega_2 \rangle$" denotes the summary edge. The term "$\exists \langle \Omega_i, \Omega_o \rangle \in P$" denotes that there exists another ordered pair of valuations that are elements of P. The term "$\forall x \in \text{Locals}_B(c)$" denotes that there exists an x, which is an element of a set of local variables in the context of the call vertex c. The term "$\Omega_1(x) = \Omega_2(x)$" denotes that the valuation of each local variable in the context of the call vertex c is the same at the ingress to a called procedure and at the egress from the called procedure. The term "$\forall x \in \text{Globals}_B(B)$" denotes that there exists an x, which is an element of a set of global variables in a program called B. The term "$\Omega_1(x) = \Omega_i(x)$" denotes that the values of global variables do not change at the ingress into the called procedure. The term "$\Omega_2(x) = \Omega_o(x)$" denotes that the globals after the call have the same value as the globals at the end of procedure pr; the procedure pr may change the value of globals; however, this condition says that the return of procedure pr to its caller does not change the value of the globals. The term "$(\Omega_1(x)=\Omega_i(x))\char`\^\Omega_o(x))$" denotes a conjunction between the two groups and confirms that the values of the global variables may be changed upon egress from the called procedure. The term "$\forall$ formals $y_j$ of pr and actuals $e_j$: $\Omega_1(e_j)=\Omega_i(y_j)$" denotes that each formal argument of a called procedure is the same as each actual argument of the invocation of the called procedure from the calling procedure.

Returning to FIG. 6B, for illustrative purposes only, suppose that $\Omega_1(g, x, y, z)=\{0, 1\}$ at the vertex 6 of the control-flow graph 602. At the vertex 7, one with ordinary skill in the art would expect that $\Omega_2(g, x, y, z)=\{1, 1, 1, 1\}$. This is because the procedure foo assigns a value of 3 to the global variable g. From here on out, whenever $\Omega_1=\{0, 1\}$, the set of summary edges associated with the vertex 6 would assume that the behavior of the procedure foo is such that an $\Psi_2=\{1, 1, 1, 1\}$.

The embodiments of the invention define a set of call vertices, which is expressed as $Call_B$. This set of call vertices represents call statements in the program. The embodiments of the invention also define a set of exit vertices, which is expressed as $Exit_B$. The embodiments of the invention also define a set of conditional vertices, which is expressed as $Cond_B$. This set of conditional vertices represents conditional statements, such as if, while, and assert. For each vertex v in the set of call vertices $Call_B$, SummaryEdges(v) is defined as the set of summary edges associated with v.

The embodiments of the invention define a transfer function at each vertex of the control-flow graph, such as the control-flow graph 602 of FIG. 6B. The transfer function aids in the analysis of the program. For each vertex v that is not an element of the set of conditional vertices $Cond_B$ and the set of exit vertices $Exit_B$, a transfer function Transfer, is defined. For each vertex v that is an element of the set of conditional vertices $Cond_B$, two transfer functions are defined: $Transfer_{v,true}$ and $Transfer_{v,false}$.

FIG. 7 is a tabular diagram showing a table containing transfer functions according to one aspect of the invention. The table 700 includes two columns, which are entitled v and $Transfer_v$. The column v includes the types of statements in a program that may give rise to various vertices. The column $Transfer_v$ defines various transfer functions for each type of statement in column v.

The transfer function is expressed by the symbol $\lambda$. The term "$\lambda<\Omega_1, \Omega_2>$" denotes a transfer function that takes two arguments $\Omega_1$ and $\Omega_2$. The term "$\Omega_1$" expresses the valuation of variables before the statement of the vertex containing the transfer function $\lambda$ is executed. The term "$\Omega_2$" expresses the valuation of variables after the statement of the vertex containing the transfer function $\lambda$ is executed. The term "$\lambda<\Omega_1, \Omega_2>$." denotes the beginning of a scope of the transfer function $\lambda$ in which the valuations $\Omega_1$ and $\Omega_2$ may be evaluated.

The row 702 of the table 700 focuses on the skip, print, goto, and return statements of a Boolean program. The term "$\Omega_2=\Omega_1$" logically compares the valuations. If the valuations are the same, then the transfer function will produce a true value; otherwise, a false value will be produced. A slightly non-standard way is used to represent a function f from a valuation $\Omega_1$ to a valuation $\Omega_2$. That is, a function f is redefined as a boolean function f, that accepts a pair of valuations $<\Omega_1, \Omega_2>$ and returns true iff $f(\Omega_1)=\Omega_2$. In this way, an arbitrary function is encoded as a boolean acceptor.

The row 704 of the table 700 focuses on parallel assignment statements. A parallel assignment statement is expressed as $x_1, \ldots, x_k:=e_1, \ldots, e_k$. A parallel assignment assigns the Boolean value of $e_1$ to the Boolean variable $x_1$, etc. The term "$(\Omega_2=\Omega_1[x_1/\Omega_1(e_1)] \ldots [x_k/\Omega_1(e_k)]$" logically compares the valuations of $\Omega_2$ with the values of Boolean variables of the valuation $\Omega_1$ being replaced by the corresponding Boolean values of $e_1, \ldots, e_k$. If the valuations are the same, then the transfer function will produce a true value; otherwise, a false value will be produced.

The row 706 of the table 700 focuses on conditional statements, such as if, while, and assert. There are two transfer functions associated with conditional statements. This makes sense since the result of a conditional statement can be one of two values: true or false.

Focusing on the transfer function $Transfer_{v,true}$, the term "$(\Omega_1(d)=1)$" logically produces a true result if the variable d at valuation $\Omega_1$ is true, or if otherwise, the term produces a false result. The term "$\Omega_2=\Omega_1$" logically produces a true result if the valuations are the same, or if otherwise, the term produces a false result. The term "$(\Omega_1(d)=1)\char`\^(\Omega_2=\Omega_1)$" produces a true result if both the variable d is true at valuation $\Omega_1$ and the valuations are the same. In other words, if the result is true, then the transfer function indicates that the true branch was taken from a conditional statement. The second term indicates that the state does not change.

Focusing on the transfer function $Transfer_{v,false}$, the term "$(\Omega_1(d)=0)$" logically produces a true result if the variable d at valuation $\Omega_1$ is false, or if otherwise, the term produces a false result. The term "$\Omega_2=\Omega_1$" logically produces a true result if the valuations are the same, or if otherwise, the term produces a false result. The term "$(\Omega_1(d)=0)\char`\^(\Omega_2=\Omega_1)$" produces a true result if both the variable d is false at valuation $\Omega_1$ and the valuations are the same. In other words, if the result is true, then the transfer function indicates that the false branch was taken from a conditional statement.

The row 708 of the table 700 focuses on procedure-call statements. A procedure-call statement is expressed as $pr(e_1, \ldots, e_k)$. The term "$e_1, \ldots, e_k$" includes actual parameters in the invocation of the procedure pr. The term "$x_1, \ldots, x_k$" includes formal parameters as declared by the procedure pr. To bring the actual parameters into the formal parameters, a parallel assignment assigns the Boolean value of $e_1$ to the Boolean variable $x_1$, etc. The term "$(\Omega_2=\Omega_1[x_1/\Omega_1(e_1)] \ldots [x_k/\Omega_1(e_k)])$" logically compares the valuations with the values of Boolean variables of the valuation $\Omega_1$ being replaced by the corresponding Boolean values of $e_1, \ldots, e_k$. If the valuations are the same, then the transfer function will produce a true value; otherwise, a false value will be produced.

Figure 8:
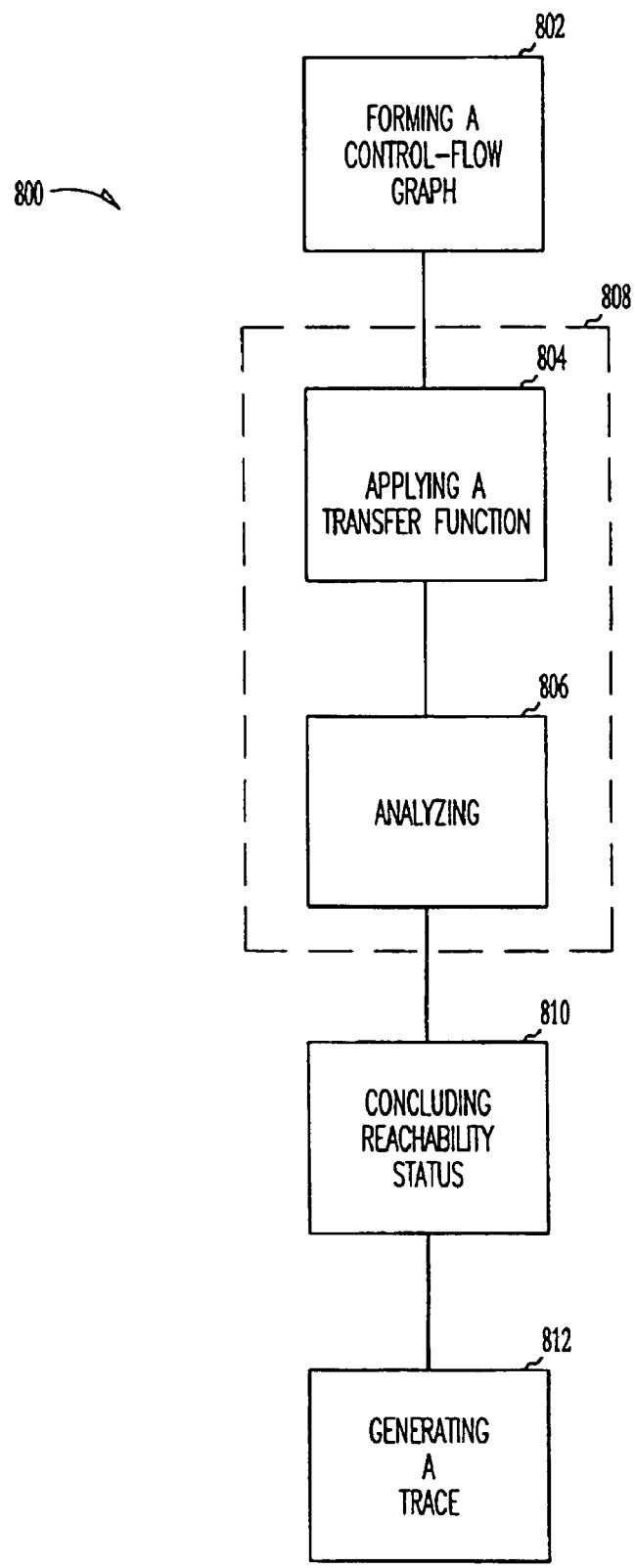
FIG. 8 is a process diagram showing a method for checking a model according to one aspect of the invention.

FIG. 8 is a process diagram showing a method for checking a model according to one aspect of the invention. FIG. 8 provides an overview of the method for checking a model. More details are provided in subsequent Figures. A process 800 includes an act 802 for forming a control-flow graph having vertices from the model.

The process 800 also includes an act 804 for applying a transfer function to a desired vertex to form a set of path edges. The process 800 includes an act 806 for analyzing the set of path edges of a vertex. The set of path edges includes valuations that are implicitly represented so as to inhibit an undesired explosion in the valuations that would hinder the act of analyzing. The process 800 includes an act 808 for iterating the act of applying 804 and the act of analyzing 806 until the act of iterating is terminated by an act of terminating (not shown).

The process 800 includes an act 810 for concluding one of two conclusions: (1) that the vertex is unreachable if the set of path edges of the vertex is empty upon the execution of the act of terminating; and (2) that the vertex is reachable if the set of path edges of the vertex is not empty upon the execution of the act of terminating. The process 800 also includes an act 812 for generating a trace to the vertex if the act of concluding concludes that the vertex is reachable. The trace is the shortest trace from the beginning of the model to the vertex.

FIG. 9 is a programmatic diagram showing a technique for checking a model according to one aspect of the invention. A program 900 declares three variables to be global variables: PathEdges, SummaryEdges, and WorkList. The PathEdges variable represents sets of path edges; each set of path edges depends on a vertex. The SummaryEdges variable represents sets of summary edges; each set of summary edges depends on a vertex. The WorkList variable represents a list of vertices to be explored by the program 900.

To access the program 900, another procedure, such as a procedure main (not shown), invokes the procedure Reachable 914 by inputting a control-flow graph $G_B$. The procedure Reachable 914 computes the set of path edges for each vertex. A vertex is reachable if-and-only if it has a non-empty set of path edges. From this, an inference can be made about whether certain statements in the model are reachable.

The procedure Reachable 914 begins by initializing various variables. The PathEdges variable is initialized at 916. For each vertex in the set of vertices $V_B$, the set of path edges associated with the vertex is initialized to the empty set. Also for each vertex in the set of call vertices, the set of summary edges associated with the vertex is initialized to the empty set. This initialization of the SummaryEdges variable occurs at 917. At 918, the set of path edges associated with a vertex of the first statement of the procedure main is initialized to a valuation of the global and local variables of the procedure main. At 920, the WorkList variable is initialized to include the vertex of the first statement of the procedure main.

The procedure Reachable 914 then places the program in a conditional loop using a while-do statement at 922. Within this loop, a vertex is removed from the WorkList variable at 924. Next, the procedure Reachable 914 conditionally switches to various sections of code depending on the type of the vertex just removed from the WorkList variable. The procedure Reachable 914 uses a switch statement to perform the conditional switches at 926.

If the vertex is a call vertex, the procedure Reachable 914 switches to the case at 928. At 930, the procedure Reachable 914 invokes a procedure called Propagate. The procedure Propagate takes two arguments. The first argument is a vertex argument and the second argument is a path edge argument.

However, before the procedure Propagate is invoked, a set of path edges associated with the call vertex is joined with a transfer function associated with the call vertex. The act of joining, which is expressed as Join(S, T), is defined as the image of set S with respect to the transfer function T. Specifically, Join(S, T)=$\{<\Omega_1, \Omega_2>|\exists\Omega_j<\Omega_1, \Omega_j>\in S\ \hat{}\ <\Omega_j, \Omega_2>\in T\}$. Thus, the act of joining produces a set of path edges.

The result of the act of joining also undergoes a self-looping process. The act of self-looping takes a set of path edges and makes self-loops with the targets of the edges. Specifically, SelfLoop(S)=$\{<\Omega_2, \Omega_2>|\exists<\Omega_1, \Omega_2>\in S\}$. The result of the self-looping becomes the path edge argument to be input into the invocation of the procedure Propagate. The vertex argument to be input into the invocation of the procedure Propagate is a successor vertex of the call vertex which is the vertex representing the first statement of the procedure being called.

The procedure Propagate receives both arguments at 904. The procedure Propagate conditionally checks to see whether the path edge argument is not a subset of the set of path edges associated with the vertex argument using an if-conditional statement at 906. If the path edge argument is a subset of the set of path edges associated with the vertex argument, no propagation need be made, and the procedure Propagate would exit at 912 to return to the calling procedure.

Otherwise, the path edge argument is not a subset of the set of path edges associated with the vertex argument. The global variable PathEdges associated with the vertex argument is updated to include the path edge argument. Specifically, the set of path edges associated with the vertex argument in PathEdges variable forms a union with the path edge argument. The vertex argument is also inserted into the WorkList variable so that it could be analyzed later.

The procedure Propagate then exits at 912 to the return to the calling procedure, which is procedure Reachable at 932. At 932, the procedure Reachable 932 again invokes the procedure Propagate. The path edge argument is formed by joining the set of path edges associated with the call vertex and the set of summary edges associated with the call vertex. The vertex argument is formed by taking the returning vertex of the call vertex. In one embodiment, this returning vertex is a projection of a skip statement.

If the vertex taken from the WorkList variable at 924 is an exit vertex, then the case at 934 is executed. The procedure Reachable enters a conditional loop using a for statement at 936. Given an index in a set of successor indices associated with the exit vertex, a vertex c, which is defined as an element of a set of call vertices, is defined at 938 such that a variable w is defined as a returning vertex associated with the call vertex c. w is the chosen successor for each loop iteration. A set of summary edges s is defined by an act of lifting at 940. The act of lifting takes two arguments: the set of path edges associated with the exit vertex and the vertex of the procedure containing the exit vertex.

If s is not a subset of a set of summary edges associated with the call vertex c at 944, then the set of summary edges associated with the call vertex c forms a union with s at 946. Next, the procedure Reachable invokes the procedure Propagate at 948 using the returning vertex w as the vertex argument, and the result of the joining of the path edges associated with the call vertex and the set of summary edges associated with the call vertex as the path edge argument. When the procedure Propagate returns, the conditional loop at 936 is again executed until no other successor indices exist with respect to the exit vertex v.

If the vertex taken from the WorkList variable at 924 is a conditional vertex, then the case at 950 is executed. The procedure Propagate is invoked at 952. The true successor vertex of the conditional vertex is selected as the vertex argument. The result of the joining of the set of path edges associated with the conditional vertex and the true transfer function associated with the conditional vertex is used as the path edge argument.

Another invocation of the procedure Propagate is invoked at 954. The false successor vertex of the conditional vertex is selected as the vertex argument. The result of joining the set of path edges associated with the conditional vertex and the false transfer function associated with the conditional vertex is used as the path edge argument.

If the vertex taken from the WorkList variable at 924 is a remainder vertex, then the case at 956 is executed. A remainder vertex is defined to be an element of a set that is a difference of the set of vertices $V_B$ and the set of call vertices, the set of exit vertices, and the set of conditional vertices. The case at 956 defines a variable p as a set of summary edges as a result of the joining of the set of path edges associated with the remainder vertex and the transfer function associated with the remainder vertex.

Next, at 960, a conditional loop is used to iterate through each successor index of the set of successor indices associated with the remainder vertex. At each iteration, the procedure Propagate is invoked using the successor index as the vertex argument and the variable p as the path edge argument.

The condition at 922 is checked to see if the WorkList variable is empty. If it is empty, then the while-loop is exited. Otherwise, various acts as described hereinbefore are repeated with another vertex extracted from the WorkList variable. Upon termination of the program 900, the set of path edges for a vertex v is empty if the vertex v is not reachable. Otherwise, the vertex v is reachable, and a shortest trajectory or trace to the vertex v can be generated.

Figure 10:
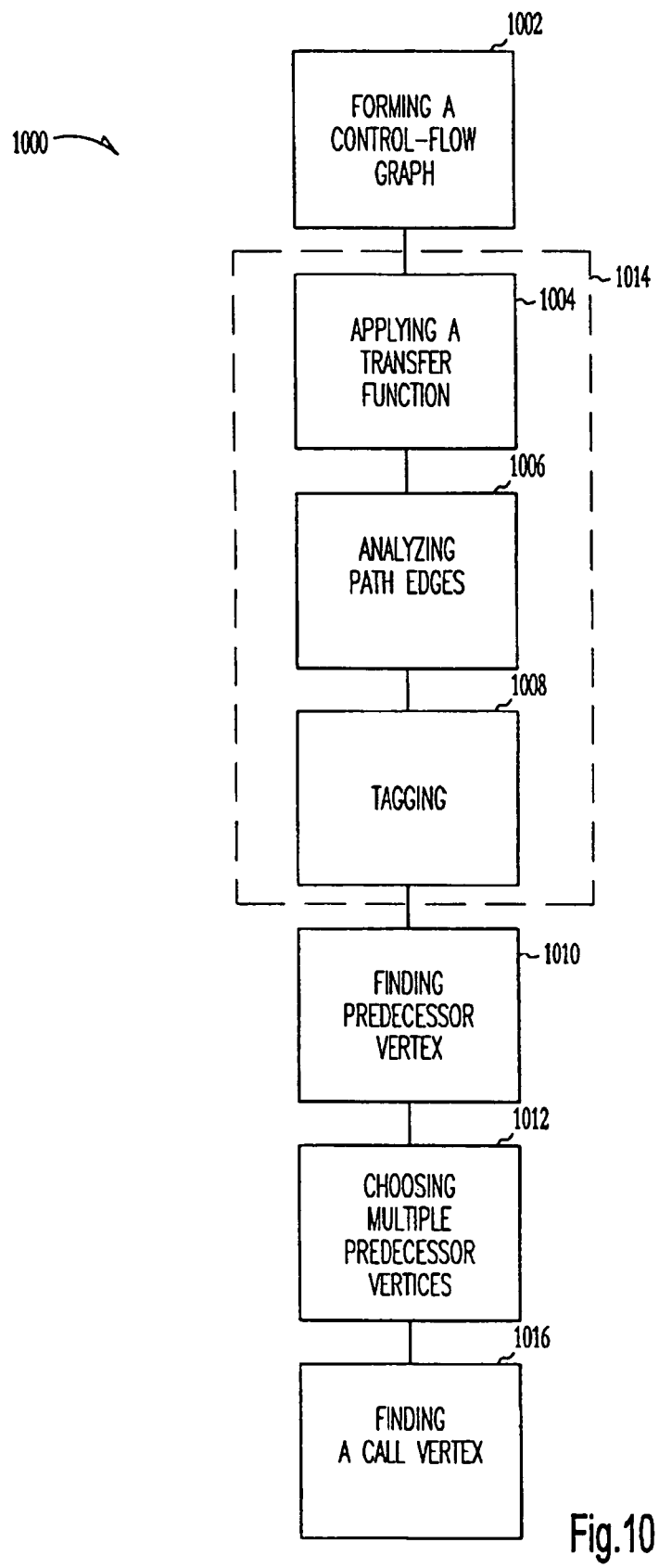
FIG. 10 is a process diagram of a method for generating a trace for a model of a program according to one aspect of the invention.

FIG. 10 is a process diagram of a method for generating a trace for a model of a program according to one aspect of the invention. If a vertex is reachable, it is desirable to understand what conditions ought to be present in a running program for a vertex to be reached. This understanding helps to further the analysis of the program. It is possible for multiple traces to exist that would reach a vertex from the beginning statement of a program. The embodiments of the invention can provide a shortest trace from the beginning of the program to a vertex that is reachable. What is discussed hereinafter is one embodiment for generating a shortest trace to a reachable vertex.

Returning to FIG. 10, a process 1000 is a method for generating a trace for a model of a program. The process 1000 includes an act 1002 for forming a control flow graph having vertices from the model. The process 1000 includes an act 1004 for applying the reachability algorithm similar to that of FIG. 9 to a desired vertex to form a set of path edges. The process 1000 includes an act 1006 for analyzing the set of path edges of a vertex. The process 1000 includes an act 1008 for tagging a unit length that the trace takes to reach the vertex from another vertex.

The process 1000 includes an act 1014 for iterating the act of applying 1004, the act of analyzing 1006, and the act of tagging 1008 so as to form at least one trace to a vertex that is reachable in the model. The trace includes multiple unit lengths that form a length of the trace.

The process 1000 further includes an act 1010 for finding the shortest trace having a length. The shortest trace can be an element of a set of traces that point to a reachable vertex. The act of finding 1010 finds a predecessor vertex that has a length minus a unit length. The process 1000 iterates the act of finding 1010 to find another predecessor vertex that has the length minus an additional unit length until no predecessor vertex can be found.

It is possible for the act of finding 1010 to find multiple predecessor vertices that have the same length. In this case, the process 1000 includes an act 1012 to choose among multiple predecessor vertices for a predecessor vertex that produces a valuation of the vertex when a transfer function is applied to the predecessor vertex. In the instance where the predecessor vertex is a call vertex, a summary may be applied to the predecessor vertex. The summary is discussed hereinbefore.

Figure 11:
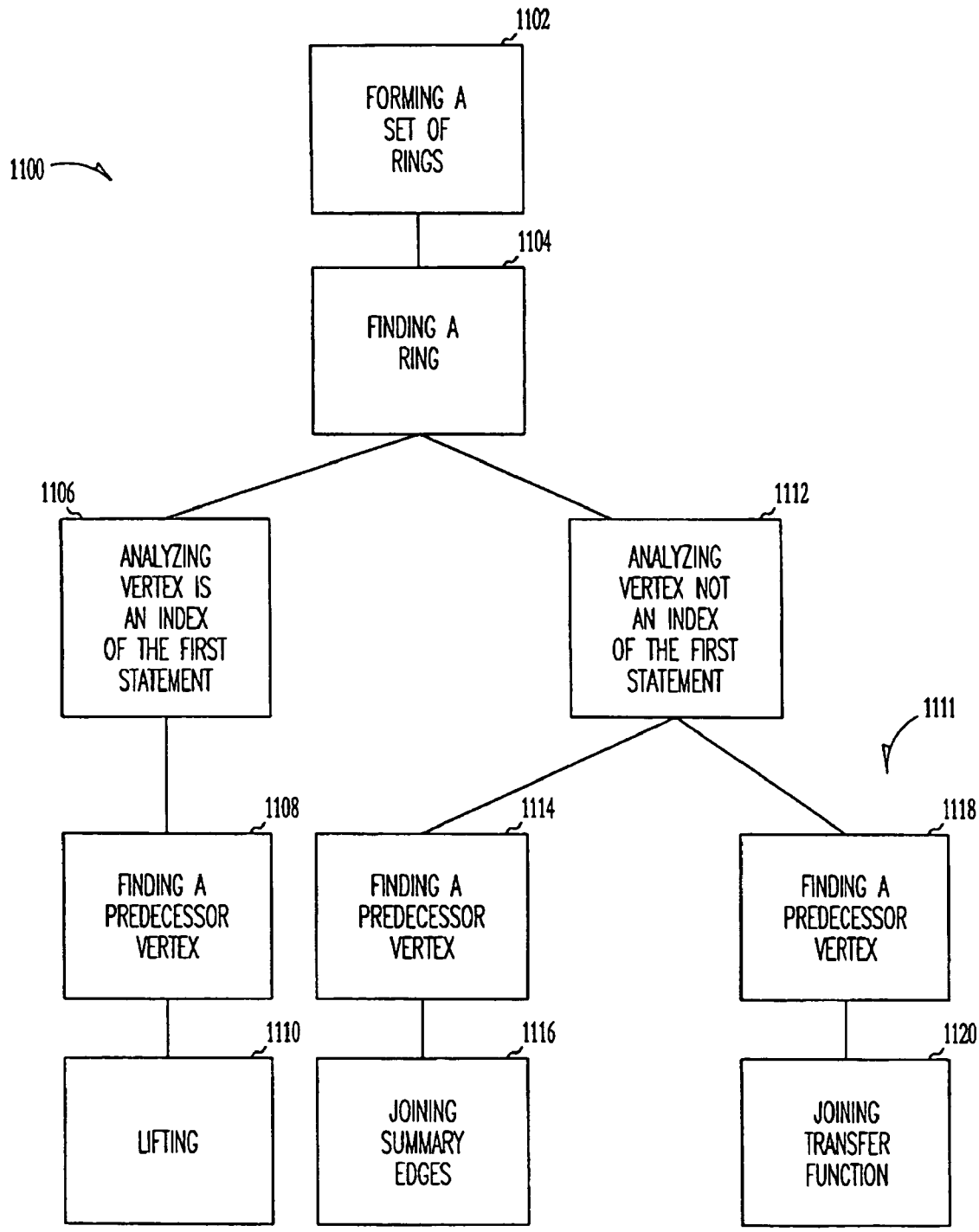
FIG. 11 is a process diagram of a method according to one aspect of the present invention.

FIG. 11 is a process diagram of a method for generating a trace for a model of a program according to one aspect of the invention. The process 1100 is an embodiment that extends a process for checking a model to keep trace of the length of the shortest hierarchical trajectory needed to reach each state. Thus, if a vertex v is reachable, the process 1100 can generate a shortest initialized hierarchical trajectory that ends in v.

A hierarchical trajectory is defined as a finite sequence $\eta' = \eta_0 \to^{\alpha_1}_B \eta_1 \to^{\alpha_2}_B \ldots \eta_{m-1} \to^{\alpha_m}_B \eta_m$ if the following conditions are satisfied: (1) for all $0 \leq i < m$, either (a) $\eta_i \to^{\alpha_i}_B \eta_{i+1}$ or (b) $\eta_i = \langle v_i, \Omega_i \rangle$, $\eta_{i+1} = v_{i+1}$, $\Omega_{i+1} \rangle$, $\alpha_i = \sigma$, $v_i \in \text{Call}_B$, and $\langle \Omega_i, \Omega_{i+1} \rangle \in \text{SummaryEdges}(v_i)$, and (2) $\alpha_i \ldots \alpha_m \in L(G(B))$. A hierarchical trajectory can "jump over" procedure calls using summary edges.

Let v be a reachable vertex and let e be a vertex of the first statement in a procedure containing the vertex v. For a path edge $\langle \Omega_e, \Omega_v \rangle \in \text{PathEdges}(v)$, there exists a set of hierarchical trajectories that start from a procedure main of a program, enter into a procedure containing the vertex v with valuation $\Omega_e$, and then reach v with valuation $\Omega_v$ without exiting the procedure containing v. The set of hierarchical trajectories comprise intraprocedural edges (edges within a procedure), summary edges, and edges that represent calling a procedure, but not the edges representing the return from a procedure.

The length of a hierarchical trajectory is the sum of the lengths of all the transitions in the hierarchical trajectory. The length of a transition $\eta_i \to^{\alpha_1}_B \eta_{i+1}$ in a hierarchical trajectory is defined to be 1 if it does not arise from a summary edge. Otherwise, if $\eta_i = v_i$, $\Omega_i \rangle$, $\eta_{i+1} = \langle v_{i+1}, \Omega_{i+1} \rangle$, $\alpha_i = \sigma$, $v_i \in \text{Call}_B$, and $\langle \Omega_i, \Omega_{i+1} \rangle \in \text{SummaryEdges}(v_i)$, then the length of $\eta_i \to^{\alpha_1}_B \eta_{i+1}$ is defined recursively to be the length of the shortest hierarchical trajectory that resulted in the creation of the summary edge $\langle \Omega_i, \Omega_{i+1} \rangle$.

The set PathEdges(v) contains all path edges that end in v. It is advantageous to separate the set PathEdges(v) into a set of sets: {PathEdges$_{r1}$(v), PathEdges$_{r2}$(v), . . . , PathEdges$_{rk}$(v)}. Because v is a reachable vertex, there is a PathEdge$_{rj}$ that represents the shortest hierarchical trajectory in the set of hierarchical trajectories. The PathEdge$_{rj}$ includes a path edge $\langle \Omega_e, \Omega_v \rangle$. The set $\{r_1, r_2, \ldots, r_k\}$ is called the set of rings associated with the vertex v.

This set of rings is used to generate the shortest hierarchical trajectories. Thus, if the vertex v is reachable, the embodiments of the invention find the smallest ring r such that PathEdges$_r$(v) exists. Each ring "r" is an integer (it arises from the length). Thus the definintion of "smallest" means the ring denoted by the smallest integer] One embodiment is described hereinbelow.

Returning to FIG. 11, the process 1100 includes an act 1102 for forming a set of rings associated with each vertex of the model. Each ring can be considered to be a length that comprises multiple unit lengths. Each unit length is tagged along each edge that reaches another edge. The process 1100 includes an act 1104 for finding a ring such that a set of path edges of a reachable vertex exists.

The process 1100 includes an act 1111 for analyzing the reachable vertex based on a type of the reachable vertex so as to generate a trace from the entry of the main procedure of the program to the reachable vertex. The act for analyzing 1111 includes an act of analyzing 1106 and an act for analyzing 1112.

The act for analyzing 1112 analyzes two cases, which will be described hereinbelow, if the reachable vertex is not an index of the first statement in a procedure containing the reachable vertex. One of the cases occurs if a statement of the reachable vertex is not a skip statement immediately following a procedure call. The act for analyzing 1112 includes an act 1118 for finding a predecessor vertex of the reachable vertex such that two conditions exist. These two conditions will be discussed hereinbelow.

One of the two conditions includes an existence of a path edge to the predecessor vertex in the set of path edges associated with the predecessor vertex at a ring one unit length less than the ring of the reachable vertex. The other of the two conditions includes an act 1120 for joining a path edge to the predecessor vertex with the transfer function at the predecessor vertex. The result of the act of joining 1120 contains a path edge to the reachable vertex.

The other case that the act for analyzing 1112 analyzes is whether a statement of the reachable vertex is a skip statement immediately following a procedure call. The act 1112 for analyzing includes an act 1114 for finding a predecessor vertex of the reachable vertex such that two conditions exist. These two conditions are discussed hereinbelow.

One of the two conditions includes the existence of a path edge to the predecessor vertex in the set of path edges associated with the predecessor vertex at a ring that is some distance L less than the ring of the reachable vertex, where L is the length of the summary edge. The other of the two conditions includes an act 1116 for joining a path edge to the predecessor vertex with a set of summary edges associated with the predecessor vertex. The result of the act of joining 1116 contains a path edge to the reachable vertex.

The act for analyzing 1111 includes an act 1106 for analyzing if the reachable vertex is an index of the first statement in the procedure containing the reachable vertex. The statement associated with the predecessor vertex is a call to a procedure containing the reachable vertex.

In one embodiment, the act of analyzing 1106 includes an act 1108 for finding the predecessor vertex and an act 1110 for lifting a valuation associated with the reachable vertex to a path edge in the set of path edges associated with the predecessor vertex.

In another embodiment, the act of analyzing 1106 includes an act 1108 for finding the predecessor vertex according to two conditions. One of the two conditions includes that the predecessor vertex be an element of a set of call vertices. The other of the two conditions includes the existence of a path edge to the predecessor vertex in the set of path edges associated with the predecessor vertex at a ring one unit length less than the ring of the reachable vertex. The existence of the path edge to the predecessor vertex satisfies a transfer function at the predecessor vertex to form a successor vertex. The successor vertex includes the reachable vertex.

FIG. 12 is a programmatic diagram showing an algorithm for performing flow-sensitive dataflow analysis for programs providing a solution to conditional meet-over-all-paths (CMOP) problem. The algorithm is an improvement over the RHS algorithm. The RHS algorithm is reformulated with the observation that the set of path edges PE can be redefined as follows:

$$PE = \bigcup_{v \in V} \{\langle \text{entry}, d_1 \rangle \rightarrow \langle v, d_2 \rangle \mid \langle d_1, d_2 \rangle \in PE'(v)\}$$

where PE'(v) has the type set-of (D×D). One difference is that path edges, regardless of whether or not the intraprocedural or interprocedural version of the RHS algorithm are considered, always have the form $$\langle \text{entry}, d_1 \rangle \rightarrow \langle v_2, d_2 \rangle$$

where entry is the entry vertex of a procedure P's control-flow graph and $v_2$ is a vertex in P's control-flow graph. Therefore, path edges are represented on a per procedure basis as a set of triples $\{\langle d_1, v_2, d_2 \rangle\}$. Taking this an additional step further, the set is partitioned on the basis of the second component $v_2$ to get a set of pairs $\{\langle d_1, d_2 \rangle\}$ for each vertex $v_2$, which is exactly PE' ($v_2$).

As a result, it is not necessary to build the exploded supergraph explicitly in order to solve the CMOP problem. Rather, a traditional dataflow analysis is performed in which each vertex v in the original control-flow graph collects a set of pairs of dataflow facts PE' (v), as shown in the $SP_{rhs}$ algorithm of FIG. 12.

In the $SP_{rhs}$ algorithm, the worklist is a map from a vertex $v \in V$ to a set of pairs of dataflow facts, representing the set of path edges associated with v that have yet to be processed. While there is a non-empty Worklist ($v_2$), a pair of facts $\langle d_1, d_2 \rangle$ is removed from Worklist ($v_2$). Together, the vertex $v_2$ and the pair $\langle d_1, d_2 \rangle$ represents the path edge $\langle \text{entry}, d_1 \rangle \rightarrow \langle v_2, d_2 \rangle$. In the RHS algorithm, there was one for loop that visited the successors $\langle v_3, d_3 \rangle$ of $\langle v_2, d_2 \rangle$. In the new algorithm, there are two for loops to achieve the same result: the outermost iterates over the successors $v_3$ of $v_2$ and the second iterates over the dataflow facts $d_3 \in M(v_2 \rightarrow v_3)(\{d_2\})$. The Propagate procedure is called with two arguments: the vertex $v_3$ and the pair dataflow facts $\langle d_1, d_3 \rangle$, which together represent the path edge $\langle \text{entry}, d_1 \rangle \rightarrow \langle v_3, d_3 \rangle$. The action of the Propagate procedure is as before (but parameterized with respect to vertex v).

The $SP_{rhs}$ algorithm involves refactoring of the structure of the data used by the RHS algorithm, based on the observation that the source vertex of a path edge is always the entry vertex of a procedure. This invariant also holds in the interprocedural version of the algorithm. The Propagate procedure is called the same number of times in the $SP_{rhs}$ and RHS algorithms, and therefore, the $SP_{rhs}$ algorithm has the same time complexity as the RHS algorithm.

FIG. 13 is a programmatic diagram showing dataflow analysis for single-procedure programs. The algorithm in FIG. 9 works for programs with multiple procedures. FIG. 13 adds path sensitivity to the $SP_{rhs}$ algorithm The $SP_{rhs}$ algorithm is generalized to solve the conditional-subset meet-over-all-paths problem, which is the lifting of the CMOP problem to apply to arbitrary subsets of D (rather than single facts of D). This allows the algorithm to track correlations between dataflow facts (elements of D), making it path-sensitive. This is useful regardless of whether or not the transfer functions in F are distributive or non-distributive. Binary Decision Diagrams (BDDs) are used to implicitly represent these sets.

Given a vertex v in the CFG G and a set $S \subseteq D$, the conditional-subset meet-over-all-paths (CSMOP) solution to IP is defined as follows:

$$CSMOP_{\langle v, S \rangle} = M_p(S) \bigcap_{p \in Paths(G, v)}$$

The $SP_{rhs}$ algorithm solves the CSMOP problem for a set S' of subsets of D and all $v \in V$. The algorithm in FIG. 13 is almost structurally identical to the algorithm given in FIG. 12. The domain of discourse has been lifted to the power set of D (that is, every occurrence of "D" in a type has been replaced by "set-of D"). As the number of subsets of D is $2^D$, the worst-case complexity of the algorithm is $O(E \times (2^D)^3)$. For the interprocedural case, the worst-case complexity is $O(E \times (2^D)^3)$.

CONCLUSION

Methods have been discussed to enhance program analysis. The embodiments of the present invention provide techniques to analyze a model of a program. The embodiments of the invention explicitly represent the control flow of the model while implicitly representing path edges, summary edges, and transfer functions. These techniques allow the embodiments of the invention to avoid an undesired explosion in the analysis. The techniques generate a set of traces to a vertex that is reachable. The set of traces includes a shortest trace to the vertex.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for analyzing a program, comprising:
   receiving a graph having a set of vertices;
   initializing sets of path edges, sets of summary edges that record input/output behavior of procedures, and a work list;
   removing a vertex having a type from the work list;
   analyzing the vertex based on the type so as to determine the reachability status of the vertex in the set of vertices, wherein analyzing includes updating a set of path edges associated with the vertex by using a transfer function associated with the vertex to form an implicit representation of the vertex by resolving the vertex to a true or false value based on the input/output behavior recorded in the summary edges, wherein updating includes executing the following acts: receiving a vertex argument and a path edge argument, forming a union of the set of path edges associated with the vertex argument and the path edge argument if the path edge argument is not a subset of the set of path edges associated with the vertex argument, and inserting the vertex argument into the work list; and
   displaying, on a display of a computer, a shortest trace to the vertex that is reachable, wherein the display of the shortest trace includes a depth of a call stack of the program and identifying the call stack at each point in the trace, wherein each point in the trace includes a state of each variable of the program that is in scope.

2. The method of claim 1, wherein displaying, on a display of a computer, includes displaying an initial value of a variable of the program in order for the vertex to be reachable.

3. The method of claim 1, wherein displaying, on a display of a computer, includes displaying whether a value of a variable in the program would change due to a call to a procedure in the program.

4. A computer-implemented method for analyzing a program, comprising:
   receiving a model of the program having multiple statements;
   labeling a statement of the multiple statements with a label;
   determining whether the label is reachable; and
   finding and displaying on a display of a computer a shortest trace having a length, wherein the shortest trace is a subset of the at least one trace, wherein finding includes finding a predecessor vertex that has the length minus a unit length and iterating the act of finding the predecessor to find another predecessor vertex that has the length minus an additional unit length until no predecessor vertex can be found, wherein the display of the shortest trace includes a depth of a call stack of the program and identifying the call stack at each point in the trace, wherein each point in the trace includes a state of each variable of the program that is in scope.

5. The method of claim 4, wherein determining includes computing a summary that records a behavior of a procedure, wherein the summary includes a set of output produced from the procedure for a set of input given to the procedure.

6. The method of claim 4, wherein determining includes checking the model based on an algorithm, wherein the complexity of the algorithm in time and space is proportional to a number of edges multiplied by 2 to the power of k, wherein k defines the maximal number of variables in scope at any point in the program, and wherein the number of edges are edges in a control-flow graph of the model.

7. The method of claim 4, wherein determining includes determining using an explicit control-flow graph.

8. The method of claim 7, wherein determining includes optimizing the model.

9. A computer-implemented method for checking a model of a program, comprising:
   forming a control-flow graph having vertices from the model;
   applying a transfer function to a vertex to form a set of path edges to form an implicit representation of the vertex by resolving the vertex to a true or false value based on the input/output behavior recorded in the summary edges;
   analyzing the set of path edges of a vertex;
   tagging a unit length that a trace takes to reach the vertex from another vertex;
   iterating the act of applying, analyzing, and tagging so as to form at least one trace to a vertex that is reachable in the model, wherein the at least one trace includes multiple unit lengths that form a length of the at least one trace; and
   finding and displaying on a display of a computer a shortest trace having a length, wherein the shortest trace is a subset of the at least one trace, wherein finding includes finding a predecessor vertex that has the length minus a unit length and iterating the act of finding the predecessor to find another predecessor vertex that has the length minus an additional unit length until no predecessor vertex can be found, wherein the display of the shortest trace includes a depth of a call stack of the program and identifying the call stack at each point in the trace, wherein each point in the trace includes a state of each variable of the program that is in scope.

10. A computer-implemented method for checking a model of a program, comprising:
   receiving a graph having a set of vertices and a successor function;
   initializing sets of path edges, sets of summary edges that record input/output behavior of procedures, and a work list;
   removing a vertex having a type from the work list;
   analyzing the vertex based on the type so as to determine the teachability status of the vertex in the set of vertices, wherein analyzing includes updating a set of path edges associated with the vertex by using a transfer function associated with the vertex to form an implicit representation of the vertex by resolving the vertex to a true or false value based on the input/output behavior recorded in the summary edges; and
   finding and displaying a shortest trace having a length, wherein finding includes finding a predecessor vertex that has the length minus a unit length and iterating the act of finding the predecessor to find another predecessor vertex that has the length minus an additional unit length until no predecessor vertex can be found, wherein the display of the shortest trace includes a depth of a call stack of the program and identifying the call stack at each point in the trace, wherein each point in the trace includes a state of each variable of the program that is in scope.

11. The method of claim 10, further comprising iterating at least two acts, wherein the at least two acts include the act of removing to remove another vertex from the work list and the act of analyzing to analyze the another vertex, wherein the act of iterating iterates until the work list is empty.

12. A system for analyzing a programming having multiple statements, the system comprising:
- a computer processor;
- a computer display; and
- a memory having computer executable modules stored thereon, wherein the computer executable modules include:
  - a modeler that receives a list of code statements of a computer program, wherein the computer processor causes the modeler to generate a Boolean model of the program,
  - a graph generator that receives the generated Boolean model from the modeler, wherein the computer processor causes the graph generator to generate a control flow graph from the generated Boolean model,
  - an optimizer that receives the generated control flow graph from the graph generator, wherein the computer processor causes the optimizer to eliminate any dead variables, and any global variables from the generated control flow graph to produce an optimized control flow graph,
  - a summarizer that receives the generated optimized control flow graph, where the computer processor causes the summarizer to summarized any procedures of the optimized control flow graph by producing summary edges from path edges,
  - an analyzer that receives the summarized control flow graph, wherein the computer processor causes the analyzer to analyze any vertex of the summarized control flow graph to determine the reachability of any statement in the program by forming an implicit representation of values of variables at any vertex, wherein the implicit representation is formed by the analyzer from a binary decision diagram, and
  - a trace generator that receives the implicit representation form the analyzer, wherein the processor causes the trace generator to display, on the computer display, an indication of reachability and a shortest trace to any vertex that is reachable, wherein the shortest trace includes a progression, through each line of the trace from a label to a first line of a procedure, wherein each line of the trace includes the state of any variables at each line.

\* \* \* \* \*